United States Patent [19]

Bessler

[11] 4,089,803
[45] May 16, 1978

[54] DEMULSIFICATION OF SURFACTANT-PETROLEUM-WATER FLOOD EMULSIONS

[75] Inventor: Donald U. Bessler, St. Louis, Mo.

[73] Assignee: Petrolite Corporation, St. Louis, Mo.

[21] Appl. No.: 713,707

[22] Filed: Aug. 12, 1976

[51] Int. Cl.$^2$ .............................................. B01D 17/04
[52] U.S. Cl. .............................. 252/344; 252/8.55 D; 252/331; 252/358
[58] Field of Search ................. 252/344, 331, 8.55 D, 252/358

[56] References Cited

U.S. PATENT DOCUMENTS

| 2,499,370 | 3/1950 | De Groote et al. ................. 252/331 |
| 3,259,587 | 7/1966 | Dickson et al. ...................... 252/344 |
| 3,637,521 | 1/1972 | Tsuk ..................................... 252/344 |
| 3,907,701 | 9/1975 | Liebold et al. ....................... 252/344 |

Primary Examiner—Benjamin R. Padgett
Assistant Examiner—E. Suzanne Parr
Attorney, Agent, or Firm—Sidney B. Ring; Hyman F. Glass

[57] ABSTRACT

This invention relates to the demulsification of surfactant petroleum water flood emulsions which comprises treating such emulsions with a demulsifier in conjunction with an amine, preferably a polyalkylenepolyamine.

14 Claims, No Drawings

DEMULSIFICATION OF SURFACTANT-PETROLEUM-WATER FLOOD EMULSIONS

In oil field production, additional oil can be recovered from a formation by waterflooding. This technique of oil recovery involves the injection of water into the oil producing formation in secondary or tertiary water floods thereby displacing the oil. The success of a water flood operation is dependent on the effectiveness by which the water replaces oil from the pores of the rock or sand formation. One technique used to achieve this displacement is to reduce the interfacial tension between the oil and water phases. The addition of surfactants to the injection fluids reduces the interfacial tension between the oil and water phases. The net result is an improved displacement of oil from the pores of the formation.

However, the use of surfactants to reduce the interfacial tension causes a stable oil-water emulsion to be formed. These emulsions are difficult and expensive to resolve by application of the usual organic demulsifiers and treating techniques. One example of a surfactant water flood involves the injection of petroleum sulfonate into the water flood. A variation of this involves the use of petroleum sulfonates followed by the injection of a high molecular weight polymer.

I have now devised a method for resolving petroleum emulsions produced from such water floods so as to yield clean oil with a minimum of tank bottoms or interfacial buildup of sludge or emulsion. This process comprises treating petroleum emulsions with conventional petroleum demulsifiers in conjunction with amines, preferably polyalkylenepolyamines.

Although a wide variety of demulsifiers can be employed in this invention, they are not all equally effective. Certain chemical classes of demulsifiers are more effective than others. For example, I have found oxyalkylated phenol-aldehyde resins more effective than the following chemical classes of demulsifiers:

(1) sulfonates
(2) oxyalkylated amines
(3) oxyalkylated alkylphenols
(4) oxyalkylated alcohols and glycols, or esters.

Furthermore, in any one class of demulsifiers certain species are more effective than others. For example, there is an optimum ratio between oxyalkylate content and type and the basic chemical. Specifically, any particular phenol-aldehyde resin has an optimum ratio of oxyalkylate to resins as well as the types and ratios of alkylene oxide employed. Thus, for each unit of resin one employs a certain optimum unit ratio of alkylene oxides. In addition, there is an optimum unit ratio of hydrophilic alkylene oxide such as ethylene oxide to hydrophobic alkylene oxides such as propylene oxide.

For example, per unit weight of butyl phenolformaldehyde resin, one employs from about 0.1 to 100 unit weight of alkylene oxides, such as from about 0.2 to 75, for example from about 0.3 to 50, but preferably from about 0.5 to 2.0 with certain resins and 25.0 to 30.0 with others. The weight ratio of hydrophilic oxide (EtO) to hydrophobic oxide (PrO) is from about 0.1 to 10.0, such as from about 0.1 to 7.5, for example from about 0.2 to 5.0, but preferably from about 0.3 to 2.0. Stated as mole units of alkylene oxide per mole unit of monomer in the resin, one employs from about 0.3 to 300 moles such as from about 0.6 to 225 moles, for example from about 0.9 to 150 but preferably from about 1.5 to 6.0 with certain resins and 75 to 90 with others. The mole ratio of EtO to PrO is from about 0.013 to 13.18, for example from about 0.26 to 6.59, but preferably from about 0.39 to 2.64.

The preferred demulsifiers employed in this invention are oxyalkylated phenol-aldehyde resins, preferably oxyalkylated alkylphenol-formaldehyde resins.

The oxyalkylating agents employed should be capable of producing oxyalkylene or polyoxyalkene groups, for example derived from any suitable α, β-alkylene oxide, for example, alkylene oxide of the formula

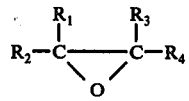

where $R_1$, $R_2$, $R_3$, $R_4$ are hydrogen or a substituted group such as alkyl, cycloalkyl, aryl, etc., for example ethylene oxide, propylene oxide, butylene oxide, amylene oxide, etc.

The phenol-aldehyde resins are of the kind described in U.S. Pat. No. 2,499,370 dated Mar. 7, 1950, to DeGroote and Keiser, preferably those resins obtained from difunctional phenols having 4 to 12 carbon atoms in the substituent hydrocarbon radical but may have as many as 18 carbon atoms, as in the case of resins prepared from tetradecylphenol, substantially paratetradecylphenol, commercially available. Similarly, resins can be prepared from hexadecylphenol or octadecylphenol.

In addition to U.S. Pat. No. 2,499,370, reference is made also to the following U.S. Pat. Nos.: 2,499,365, 2,499,366, and 2,499,367, all dated Mar. 7, 1950, to DeGroote and Keiser. These patents, along with the others, describe phenolic resins of the kind herein employed.

The following formula represents a phenol-formaldehyde resin. Actually, some other aldehyde, such as acetaldehyde, propionaldehyde, or butyraldehyde, may be used. The resin unit can be exemplified thus:

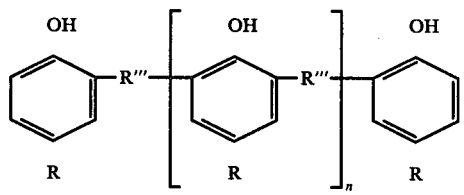

R = hydrocarbon, preferably alkyl in which R''' is the divalent radical obtained from the particular aldehyde employed to form the resin.

The preparation of resins of the kind herein employed as reactants is well known. See U.S. Pat. No. 2,499,368, dated Mar. 7,1950, to DeGroote and Keiser. Resins can be made using an acid catalyst or basic catalyst or a catalyst showing neither acid nor basic properties in the ordinary sense, or without any catalyst at all. It is preferable that the resins employed be substantially neutral. In other words, if prepared by using a strong acid as a catalyst, such strong acid should be neutralized. Similarly, if a strong base is used as a catalyst it is preferable that the base be neutralized although I have found that sometimes the reaction described proceeded more rapidly in the presence of a small amount of free base. The amount may be as small as a 200th of a percent and as much as a few tenths of a percent. Sometimes moderate increase in caustic soda and caustic potash may be used. However, the most desirable procedure in practically every case is to have the resin neutral.

In preparing resins one does not get a single polymer, i.e., one having just three units, or just four units, or just five units, or just six units, etc. It is usually a mixture; for instance, one approximating four phenolic nuecli will have some trimer and pentamer present. Thus, the molecular weight may be such that it corresponds to a fractional value for $n$ as, for example, 3.5, 4.5 or 5.2.

In the actual manufacture of the resins I found no reason for using other than those which are lowest in price and most readily available commercially. For purpose of convenience suitable resins are characterized in the following table:

TABLE I

| Ex. No. | R | Position of R | R''' derived from | n | Mol.wt. of resin molecule (based on n+2) |
|---|---|---|---|---|---|
| 1a | Phenyl | Para | Formaldehyde | 3.5 | 992.5 |
| 2a | Tertiary butyl | " | " | 3.5 | 882.5 |
| 3a | Secondary butyl | Ortho | " | 3.5 | 882.5 |
| 4a | Cyclohexyl | Para | " | 3.5 | 1,025.5 |
| 5a | Tertiary amyl | " | " | 3.5 | 959.5 |
| 6a | Mixed secondary and tertiary amyl | Ortho | " | 3.5 | 805.5 |
| 7a | Propyl | Para | " | 3.5 | 805.5 |
| 8a | Tertiary hexyl | " | " | 3.5 | 1,036.5 |
| 9a | Octyl | " | " | 3.5 | 1,190.5 |
| 10a | Nonyl | " | " | 3.5 | 1,267.5 |
| 11a | Decyl | " | " | 3.5 | 1,344.5 |
| 12a | Dodecyl | " | " | 3.5 | 1,498.5 |
| 13a | Tertiary butyl | " | Acetaldehyde | 3.5 | 945.5 |
| 14a | Tertiary amyl | " | " | 3.5 | 1,022.5 |
| 15a | Tertiary amyl | " | " | 3.5 | 1,330.5 |
| 16a | Tertiary butyl | " | Butyraldehyde | 3.5 | 1,071.5 |
| 17a | Tertiary amyl | " | " | 3.5 | 1,148.5 |
| 18a | Nonyl | " | " | 3.5 | 1,456.5 |
| 19a | Tertiary butyl | Para | Propionaldehyde | 3.5 | 1,008.5 |
| 20a | Tertiary amyl | " | " | 3.5 | 1,085.5 |
| 21a | Nonyl | " | " | 3.5 | 1,393.5 |
| 22a | Tertiary butyl | " | Formaldehyde | 4.2 | 996.6 |
| 23a | Tertiary amyl | " | " | 4.2 | 1,083.4 |
| 24a | Nonyl | " | " | 4.2 | 1,430.6 |
| 25a | Tertiary butyl | " | " | 4.8 | 1,094.4 |
| 26a | Tertiary amyl | " | " | 4.8 | 1,189.6 |
| 27a | Nonyl | " | " | 4.8 | 1,570.4 |
| 28a | Tertiary amyl | " | " | 1.5 | 604.0 |
| 29a | Cyclohexyl | " | " | 1.5 | 646.0 |
| 30a | Hexyl | " | " | 1.5 | 653.0 |
| 31a | Hexyl | " | Acetaldehyde | 1.5 | 688.0 |
| 32a | Octyl | " | " | 1.5 | 786.0 |
| 33a | Nonyl | " | " | 1.5 | 835.0 |
| 34a | Octyl | " | Butyraldehyde | 2.0 | 986.0 |
| 35a | Nonyl | " | " | 2.0 | 1,028.0 |
| 36a | Amyl | " | " | 2.0 | 860.0 |
| 37a | Butyl | " | Formaldehyde | 2.0 | 636.0 |
| 38a | Amyl | " | " | 2.0 | 692.0 |
| 39a | Hexyl | " | " | 2.0 | 748.0 |
| 40a | Cyclohexyl | " | " | 2.0 | 740.0 |

These resins are oxyalkylated to form the demulsifier of this invention to form oxyalkylates of the general formula

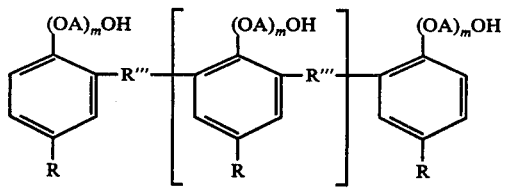

Where A is the alkylene unit derived from the alkylene oxide and $m$ is the number of alkylene oxides per monomer unit A wide variety of amines can be employed in this invention including mono and polyamines. In general, the polyamines employed are polyalkylene polyamines for example of the general formula $$NH_2(AN)_n{}^HH$$

where A is alkylene and $n$ a number, for example 1–10 or greater. A is for example $(CH_2)_x$ where $x$ is 2 to 10 or greater. For example $NH_2CH_2NHCH_2NH_2$ would be an effective amine to use.

In practice, I have found mixtures of polyalkylene polyamines very effective and economical as illustrated by the following:

(1) Tretamine #2 which is a mixture of polyamines of the formula $NH_2(Ch_2CH_2N)_x{}^HH$ which contains diethylene triamine and triethylene tetramine with minor amounts of ethylene diamine, tetraethylene tetramine pentamine and higher.

(2) Pentamethylene hexamine and pentamethylene bottoms (3) Bis (hexamethylene) triamines

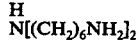

(4) Alkanolamines such as Amine NJ which is predominantly triethanolamine; as well as the condensed alkanolamine such as polyalkanolamines.

The following compositions illustrate compositions of this invention.

| Wgt % Active Ingredients | | Composition 1 | Wgt. % Total Formulation |
|---|---|---|---|
| oxyalkylated resin | 60% | Demulsifier: Butylphenol-formaldehyde resins 20wgt PrO+7WgtEtO | 30.0 |
| Amine | 40% | Amine: Pentaethylene Hexamine bottoms Solvent | 20.0 50.0 |

Composition 2

Composition 1 where the oxyalkylated resin is 10% and the amine is 90% on an active basis.

Composition 3

Composition 1 where the oxyalkylated resin is 80% and the amine is 20% on an active basis.

Composition 4

Composition 1 where the amine is tetraethylene pentamine.

Composition 5

Composition 1 where the amine is diethylenetriamine.

Composition 6

Composition 1 where the amine is pentaethylene hexamine.

Compositions 7, 8, 9, 10, 11, 12

Compositions 1, 2, 3, 4, 5, 6 where the oxyalkylated resin is a mixed butyl/nonylphenol-formaldehyde resin + 0.4 wgt. EtO + 0.2 wgt. PrO, the amine being the same as in the above.

Compositions 13-24

Compositions 1-12 where the amine is Amine NJ (triethanol amine) instead of the amine of said compositions.

Compositions 25-36

Compositions 1-12 where the amine is Bis (hexamethylene) triamine instead of the amine in said compositions.

Test Examples

The following treating agents were added in the amounts shown in the Table below to a sample of total produced fluids containing 20% oil and 500 ppm of petroleum sulfonate. The best bottles were agitated and allowed to stand for 6 hrs. at 70° F The results are presented in the following Table II.

Table II

Sample — Total Produced fluids (20% oil, 500 ppm petroleum sulfonate concentration)

| Test Conditions — | Time | 6 hours | | |
| | Temperature | 70° F | | |
| | Agitation | 100 shakes | | |

| Ex. | Treating Agent | Concentration ppm | Visual Observation Water | Visual Observation Interface | Oil Quality BS&W% |
|---|---|---|---|---|---|
| 1 | Blank | — | poor | poor 10 ml emulsion | 35.0 |
| 2 | Composition Ex. 1 | 25 | poor | fair 2 ml emulsion | 4.8 |
| 3 | Composition Ex. 1 | 50 | fair | good trace emulsion | 0.6 |
| 4 | Composition Ex. 1 | 100 | good | excellent | 0.1 |
| 5 | Composition Ex. 1 | 200 | good | excellent | 0.0 |
| 6 | butylphenol + PrO+EtO 1/20/7 wgt. ratio | 50 | poor | poor | 34.2 |
| 7 | butylphenol+PrO +EtO 1/20/7 wgt. ratio | 200 | Poor | poor | 34.0 |
| 8 | butylphenol+PrO +EtO 1/20/7 wgt. ratio | 500 | poor | poor | 34.8 |
| 9 | Tretamine #2 | 50 | poor | poor | 35.0 |
| 10 | Tretamine #2 | 200 | poor | poor | 34.2 |
| 11 | Tretamine #2 | 500 | poor | poor | 34.6 |

Oil was separated from total produced fluids. The separated oil contained 38% BS&W and 500 ppm of petroleum sulfonate.

The treating agents were added to the separated oil in the concentrations shown in the following Table, shaken 100 times and allowed to stand for 6 hours at 70° F. The results are shown in the following Table III.

Table III

Sample — Oil only after free water removed 38% BS&W, 500 ppm petroleum sulfonate

| Test Conditions — | Time | 6 hours | | |
| | Temperature | 70° F | | |
| | Agitation | 100 shakes | | |

| Ex. | Treating Agent | Concentration ppm | Visual Observation Water ml. | Visual Observation Interface ml. | Oil Quality BS&W% |
|---|---|---|---|---|---|
| 1 | Blank | — | 0 | 52 | 38.4 |
| 2 | Composition Ex. 1 | 200 | 1 | 36 | 36.6 |
| 3 | Composition Ex. 1 | 500 | 30 | 6 | 4.8 |
| 4 | Composition Ex. 1 | 1000 | 37 | 0 | 0.1 |
| 5 | Composition Ex. 1 | 1500 | 37 | 0 | 0.0 |
| 6 | Butylphenol+PrO +EtO 1/20/7 wgt. ratio | 200 | 0 | 51 | 38.0 |
| 7 | Butylphenol+PrO +EtO 1/20/7 wgt. ratio | 1000 | 0 | 48 | 37.8 |
| 8 | Butylphenol+PrO +EtO 1/20/7 wgt. ratio | 2000 | 0 | 46 | 38.2 |
| 9 | Tretamine #2 | 200 | 0 | 52 | 37.6 |
| 10 | Tretamine #2 | 1000 | 0 | 51 | 37.8 |
| 11 | Tretamine #2 | 2000 | 0 | 49 | 37.0 |

The above tests of Tables II and III were repeated with Amine NJ or BHMT amine in place of the pentaethylene hexamine in composition. Results similar to those in the above tables were obtained, but required a higher concentration than shown in Tables II and III in order to produce sealable oil.

The tests in Table II and Table III were also run in which the oxyalkylated resin of Compound 1 was substituted with butyl/nonylphenol-formaldehyde resin + 0.4 wgt. EtO + 0.2 wgt. PrO. Similar results were obtained.

From the above tables it is evident that the demulsifier in conjunction with the amine is superior to either the demulsifier or the amine employed separately (compare Examples 2-4 in both Table II and III with other examples of Tables).

The concentration of demulsifier and amine in the fluids to be treated may vary depending on the particular fluids to be treated, the type of and amount of surfactant in the treated fluid, the particular demulsifier employed, the conditions of treatment, etc. In general one employs at least about 12 ppm of demulsifier based on treated fluids such as from about 12 to 1000 ppm, for example from about 20 to 200 ppm, but preferably from about 30 to 60 ppm.

In general, one employs at least about 8 ppm of amine, such as from about 8 to 1000 ppm, for example from about 10 to 100 ppm, but preferably from about 20 to 40 ppm.

In general, the formulation employed contains any suitable ratio of demulsifier to amine which can deliver the proper ratio to the system. Thus, the weight ratio of demulsifier to amine can vary from about 1 to 90 such as about 10 to 80, for example from 25 to 75, but preferably from about 40 to 60.

The formulation can be dissolved in any suitable solvent capable of delivering the formulation to the system to be treated in any suitable concentration such as from an active concentration of 10-100%, such as from 25-75%, but preferably from 40 to 60%.

I claim:

1. A composition for demulsification of surfactant-petroleum-water flood emulsions comprising an oxyalkylated phenol-aldehyde resin and an amine selected from the group consisting of polyalkylene polyamines of the general formula

where A is $(CH_2)_x$ where $x$ is 2 to 10 and $n$ is a number from 1 to 10 and alkanolamines, the weight ratio of resin to amine varying from about 1 to 90.

2. The composition of claim 1 where the resin is an oxyalkylated phenol-formaldehyde resin.

3. The composition of claim 2 where the resin and amine are present in an amount of 60% to 40% amine.

4. The composition of claim 3 where the amine is pentaethylene hexamine.

5. The composition of claim 4 where the oxyalkylated phenol-formaldehyde resin has alkyl groups of from 4–9 carbons.

6. The composition of claim 2 where the amine is an alkanol amine.

7. The composition of claim 6 where the alkanol amine is triethanol amine.

8. A process of resolving emulsion formed during surfactant water flooding which comprises treating said emulsion with the composition of claim 1 in a concentration of 12 to 1000 parts resin per million parts emulsion and 8 to 1000 parts amine per million parts emulsion.

9. A process of resolving emulsion formed during surfactant water flooding which comprises treating said emulsion with the composition of claim 2.

10. A process of resolving emulsion formed during surfactant water flooding which comprises treating said emulsion with the composition of claim 3.

11. A process of resolving emulsion formed during surfactant water flooding which comprises treating said emulsion with the composition of claim 4.

12. A process of resolving emulsion formed during surfactant water flooding which comprises treating said emulsion with the composition of claim 5.

13. A process of resolving emulsion formed during surfactant water flooding which comprises treating said emulsion with the composition of claim 6.

14. A process of resolving emulsion formed during surfactant water flooding which comprises treating said emulsion with the composition of claim 7.

* * * * *